United States Patent [19]
Darlington

[11] 3,940,673
[45] Feb. 24, 1976

[54] AIRCRAFT ALTITUDE CONTROL SYSTEM

[75] Inventor: William W. Darlington, Sherman Oaks, Calif.

[73] Assignee: Edcliff Instruments, Monrovia, Calif.

[22] Filed: Oct. 29, 1974

[21] Appl. No.: 518,230

Related U.S. Application Data

[63] Continuation of Ser. No. 360,314, May 14, 1973, abandoned.

[52] U.S. Cl. .......... 318/584; 235/150.2; 244/77 D; 340/347 AD
[51] Int. Cl.² ................. B64C 13/18; G05D 1/08; H03K 13/02
[58] Field of Search .......... 244/77 D; 340/347 AD, 347 NT; 235/92 MP, 150.2; 318/489, 584

[56] References Cited
UNITED STATES PATENTS

| | | | |
|---|---|---|---|
| 3,276,012 | 9/1966 | Secretan | 340/347 AD |
| 3,298,019 | 1/1967 | Nossen | 340/347 AD |
| 3,316,547 | 4/1967 | Ammann | 340/347 NT |
| 3,578,269 | 5/1971 | Kramer et al. | 244/77 D |
| 3,626,262 | 12/1971 | Kelling | 235/92 MP |

OTHER PUBLICATIONS

Analog Devices, Inc., *Analog-Digital Conversion Handbook*, 1972, pp. III–84 & III–85.

*Primary Examiner*—Thomas J. Sloyan
*Attorney, Agent, or Firm*—Flehr, Hohbach, Test, Albritton & Herbert

[57] ABSTRACT

System for sampling and holding an analog signal corresponding to the altitude of an aircraft and providing a control signal for maintaining the aircraft at the altitude where sampling occurs. A binary converter stores a count corresponding to the level of the sampled signal, and a digital-to-analog counter provides an output analog signal corresponding to the count registered by the counter. The altitude signal is compared with the output signal to provide an altitude correction signal in the event that the altitude signal deviates from the level corresponding to the stored count.

4 Claims, 3 Drawing Figures

3,940,673

AIRCRAFT ALTITUDE CONTROL SYSTEM

This is a continuation of application Ser. No. 360,314, filed May 14, 1973, now abandoned. 3,881,542.

BACKGROUND OF THE INVENTION

This invention pertains generally to aircraft control systems and more particularly to a system for maintaining an aircraft at a constant altitude.

One type of altitude holder heretofore provided for use with an auto pilot utilizes a servomotor and a potentiometer to provide a reference signal corresponding to the altitude to be held. The servomotor positions the potentiometer in accordance with the altitude of the aircraft, and when a desired altitude is reached, the motor is stopped. Thereafter, the potentiometer provides a fixed reference corresponding to the desired altitude. This system has the advantage of holding indefinitely, but it also has disadvantages such as size, weight and speed.

Electronic sample and hold circuits using capacitive storage elements have heretofore been provided for storing analog signals. Such circuits lack the ability to hold for long periods of time because leakage currents tend to discharge the capacitors, and the signals are lost.

SUMMARY AND OBJECTS OF THE INVENTION

The invention provides an altitude control system utilizing a digital counter for storing a count corresponding to the altitude to be held. A digital-to-analog converter provides an output signal corresponding to the count registered in the counter, and means is provided for comparing the altitude signal with the output signal corresponding to the stored count to provide an altitude correction signal for maintaining the aircraft at a constant altitude.

It is in general an object of the invention to provide a new and improved system for maintaining an aircraft at a constant altitude.

Another object of the invention is to provide a system of the above character utilizing a digital counter for storing a count corresponding to the altitude to be maintained and a digital-to-analog converter for providing an analog output signal corresponding to the count registered in the counter.

Another object of the invention is to provide a system of the above character which includes means for comparing the current altitude signal with the stored altitude signal to provide an altitude correction signal corresponding to the difference between the compared signals.

Additional objects and features of the invention will be apparent from the following description in which the preferred embodiment is set forth in detail in conjunction with the accompanying drawings.

BRIEF DESCRIPTIONS OF THE DRAWINGS

DESCRIPTION OF THE PREFERRED EMBODIMENT

Figure 1:
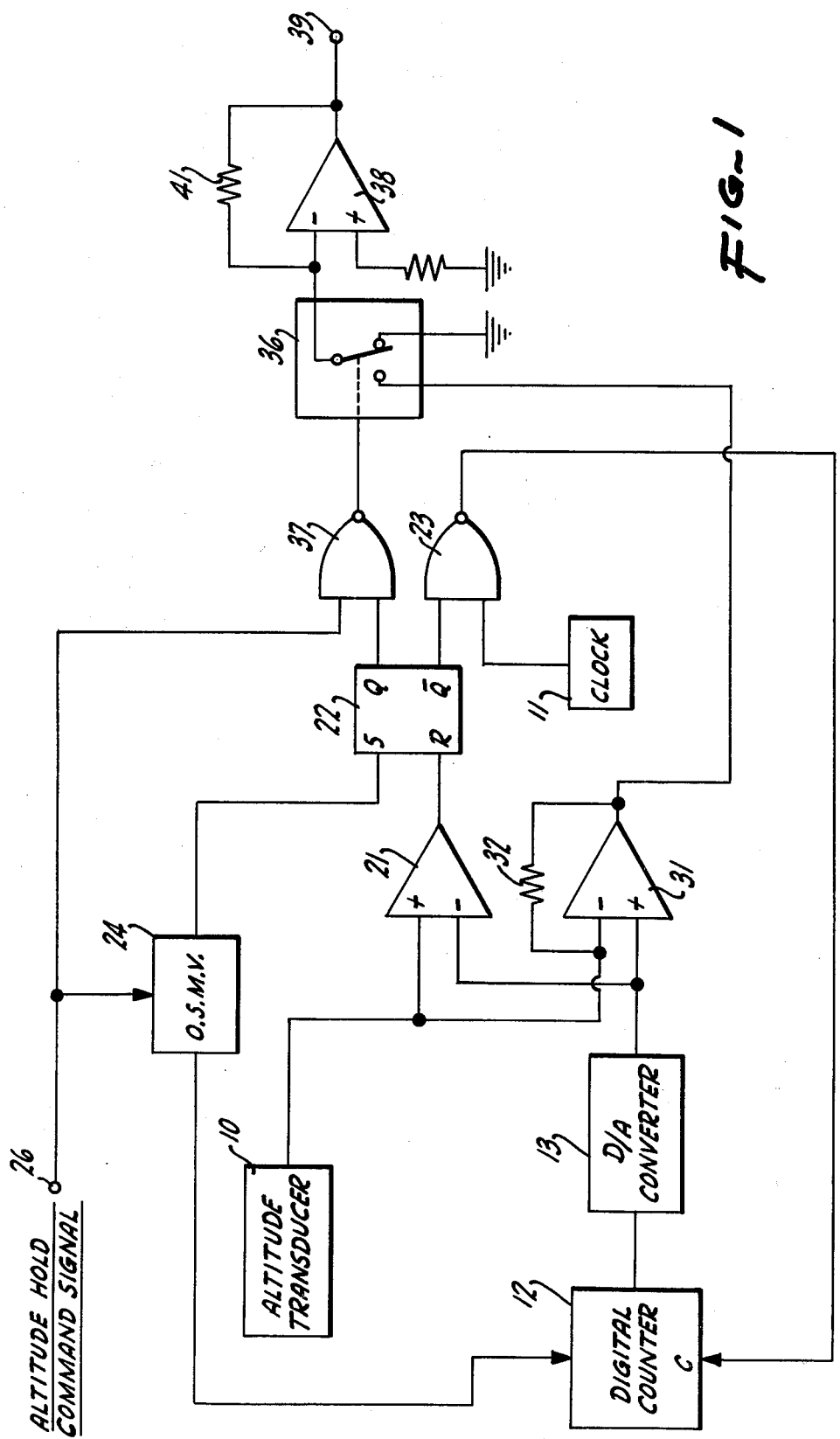
FIG. 1 is a block diagram of one embodiment of a system incorporating the invention for maintaining an aircraft at a constant altitude.

As illustrated in FIG. 1, the control system includes an altitude transducer 10, a source of clock pulses 11, a digital counter 12, and a digital-to-analog converter 13. The transducer is preferably of the type that senses atmospheric static pressure and produces an electrical analog signal, e.g., voltage, that is directly proportional to altitude. The clock pulse source is a conventional oscillator or pulse generator for providing rectangular pulses at a predetermined frequency such as 1 MHz.

Figure 2:
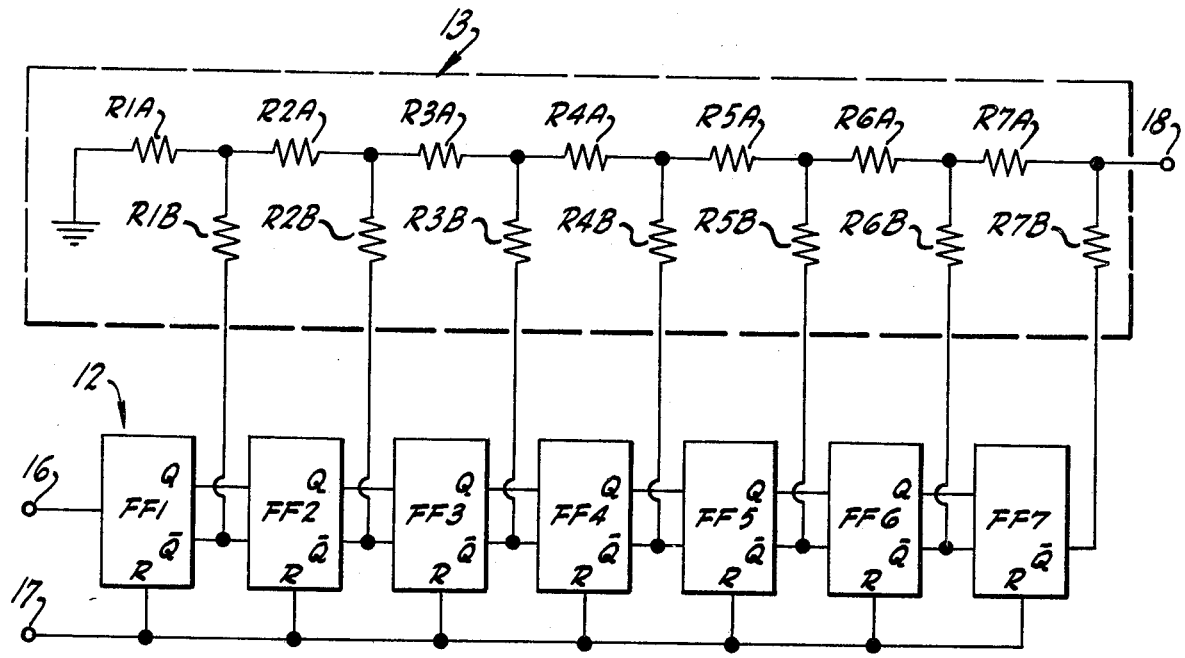
FIG. 2 is a functional diagram of the digital counter and digital-to-analog converter for sampling and holding an altitude signal in the embodiment of FIG. 1.

Digital counter 12 and digital-to-analog converter 13 are shown in greater detail in FIG. 2. The counter is a resettable binary counter having a plurality of counter stages. Each stage includes a flip-flop, and the stages are designated FF1–FF7. Although the counter is illustrated as having seven stages, a greater or lesser number can be provided if desired. The counter has a clock input terminal 16 which is connected to the input of the first stage FF1, and the Q and $\overline{Q}$ outputs of each stage except the last are connected to the inputs of the succeeding stage. The reset inputs of the stages are all tied together and connected to a terminal 17. The counter is preferably constructed in the form of an integrated circuit, and suitable IC's are available commercially. One such IC is type CD4024AD manufactured by the Solid State Division of RCA.

Digital-to-analog converter 13 is connected to counter 12, and it provides an analog output signal, e.g., voltage, corresponding to the count registered in the counter. As illustrated in FIG. 2, the converter comprises a resistance ladder network which functions as a voltage divider. The ladder network has the same number of stages as the counter, and each stage comprises a pair of resistors designated R1A, R1B and so on. Resistors R1A – R7A are connected in series between ground and an output terminal 18. Resistors R1B – R7B are connected to the $\overline{Q}$ outputs of the respective counter stages.

Figure 3:
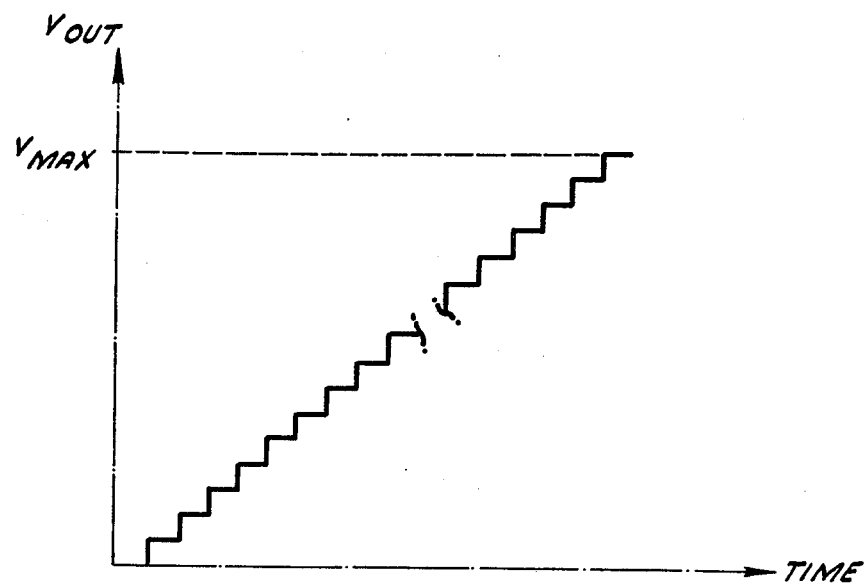
FIG. 3 is a graphical representation of the output signal provided by the digital-to-analog converter shown in FIG. 2.

As illustrated in FIG. 3, voltage $V_{out}$ at output terminal 18 increases in discrete steps from an initial level of zero toward a maximum voltage $V_{Max}$ at a rate of one step for each pulse applied to the counter. The maximum voltage is determined by the supply voltage of the counter, and the magnitude of each step is determined by the number of stages in the counter. With a supply voltage of 10 volts and 7-stage counter, there is a maximum of 128 steps, and each step has a magnitude on the order of 78 millivolts. With a 10 volt supply and 12 stages, there would be 4096 steps, each having a magnitude of 2.4 millivolts.

Means is provided for conditioning counter 12 to count the pulses from clock 11 until the voltage at the output of digital-to-analog converter 13 reaches the level of the altitude voltage from transducer 10. This means includes a voltage comparator 21, a R-S flip-flop 22, a NAND gate 23, and a one-shot multivibrator 24. The outputs of transducer 10 and converter 13 are connected to the inputs of comparator 21. The comparator has high and low output states, and it switches between them in accordance with the relative magnitudes of the signals at its inputs. Thus, if the voltage from transducer 10 is greater than the voltage from converter 13, the output is high, and if the converter voltage is higher, the output is low.

The output of voltage comparator 21 is connected to the reset input of flip-flop 22. This flip-flop is a conventional bistable device which switches between set and reset states in accordance with input signals applied thereto. The Q̄ output of the flip-flop is connected to one input of NAND gate 23, and clock pulse source 11 is connected to a second input of this NAND gate. The output of the NAND gate is connected to the clock input of counter 12.

A one-shot multivibrator 24 is connected for receiving an altitude hold command signal as an input from an input terminal 26. The outputs of the multivibrator are connected to the reset input of counter 12 and to the set input of flip-flop 22.

Summation means is provided for comparing the signals from transducer 10 and converter 13 to provide an altitude correction signal corresponding to the difference between them. This means comprises a differential amplifier 31 having a negative input connected to the output of transducer 10 and a positive input connected to the output of converter 13. A gain setting resistor 32 is connected between the output and the negative input of the amplifier.

The output of amplifier 31 is connected to a solid state switching device 36 which is shown schematically in FIG. 1. The state of the switching device is controlled by the output of a NAND gate 37 which has one input connected to the Q output of flip-flop 22 and a second input connected to input terminal 26 for receiving the command signal. The output of switching device 36 is connected to the inverting input of an operational amplifier 38, and the output of this amplifier is connected to an output terminal 39. A gain setting resistor 41 is connected between the output and the inverting input of the operational amplifier.

Operation and use of the altitude control system can be described briefly. It is assumed that the system is installed in an aircraft and that output terminal 39 has been connected to an automated control system, such as an auto pilot, in the aircraft. When the aircraft reaches an altitude which the pilot desires to maintain, he applies an altitude hold command signal to input terminal 26. Upon receipt of this signal, multivibrator 24 produces a pulse which resets counter 12 to its initial level of zero and sets flip-flop 22. With the flip-flop in its set condition, NAND gate 23 is enabled and NAND gate 37 is disabled. With NAND gate 37 disabled, switching device 36 grounds the inverting input of operational amplifier 38, and no altitude correction signal is delivered to output terminal 39.

When NAND gate 23 is enabled, pulses pass from clock pulse source 11 to counter 12 where they are counted. As each pulse is counted, the output of converter 13 increases one step as illustrated in FIG. 3. Voltage comparator 21 monitors the outputs of transducer 10 and converter 13, and when the converter output exceeds the level of the transducer output, the output state of the comparator switches, resetting flip-flop 22. When the flip-flop is reset, the enabling signal is removed from NAND gate 23, and no further clock pulses are delivered to the counter. The counter retains the count registered therein, and the output of converter 13 remains at the level corresponding to this count. This level also corresponds to the desired altitude for the aircraft.

When flip-flop 22 is reset, NAND gate 37 is enabled, and as long as the altitude hold command signal is present, switching device 36 connects the output of amplifier 31 to the input of amplifier 38. Any deviation of the aircraft from its desired altitide produces a correction signal at the output of amplifier 31, and this signal is applied to the output terminal and auto pilot to return the aircraft to the desired altitude.

When the altitude hold signal is removed, the output of NAND gate 37 switches, and switching device 36 disconnects the output of amplifier 31 from the input of amplifier 38. Thereafter, the system has no effect on the operation of the aircraft until a new command signal is applied to input terminal 26.

It is apparent from the foregoing that a new and improved system for maintaining aircraft at a constant altitude has been provided. While only the presently preferred embodiment has been described herein, as will be apparent to those familiar with the art, certain changes and modifications can be made without departing from the scope of the invention as defined by the following claims.

I claim:

1. In a system for sampling and holding analog signals corresponding to the altitude of an aircraft and providing a control signal for maintaining the aircraft at the altitude corresponding to the level of the altitude signal when sampled, altitude transducer means for providing an analog altitude signal corresponding to the altitude of the aircraft, a source of clock pulses, digital counting means, digital-to-analog converter means connected to the counting means for providing an analog output signal having a level corresponding to the count registered by the counting means, gating means connected between the source of pulses and the counting means for passing pulses from the source to the counting means in the presence of an enabling signal and blocking the passage of pulses in the absence of the enabling signal, bistable means connected to the gating means and having first and second output states, said bistable means being adapted for delivering an enabling signal to the gating means when in its first output state, means for resetting the counting means to an initial level and setting the bistable means to its first output state in response to an externally applied command signal, comparator means responsive to the altitude and output signals for delivering a signal to the bistable means for switching the same to its second output state to remove the enabling signal from the gating means when the output signal reaches the level of the altitude signal, thereby blocking the delivery of further pulses to the counting means so that the count registered by the counting means and the output signal remain at levels corresponding to the altitude of the aircraft at the time the command signal is applied, and means responsive to the altitude and output signals for providing an altitude correction signal corresponding to the difference between the altitude signal and the output signal when the bistable means is in its second output state.

2. A system as in claim 1 wherein the counting means comprises a binary counter having a plurality of counting stages.

3. A system as in claim 1 wherein the digital-to-analog converter means comprises a resistance ladder network.

4. A system as in claim 1 wherein the bistable means comprises a flip-flop.

* * * * *